(12) United States Patent
Vida

(10) Patent No.: US 9,998,036 B2
(45) Date of Patent: Jun. 12, 2018

(54) DEVICE FOR GENERATING A MOVEMENT, MOTOR COMPRISING SAID DEVICE AND USE OF THE LATTER

(71) Applicant: Nikolaus Vida, Habsburg (CH)

(72) Inventor: Nikolaus Vida, Habsburg (CH)

( * ) Notice: Subject to any disclaimer, the term of this patent is extended or adjusted under 35 U.S.C. 154(b) by 359 days.

(21) Appl. No.: 14/438,253

(22) PCT Filed: Oct. 24, 2013

(86) PCT No.: PCT/EP2013/072256
§ 371 (c)(1),
(2) Date: Apr. 24, 2015

(87) PCT Pub. No.: WO2014/064186
PCT Pub. Date: May 1, 2014

(65) Prior Publication Data
US 2015/0333662 A1    Nov. 19, 2015

(30) Foreign Application Priority Data

Oct. 24, 2012    (DE) .......................... 10 2012 020 836
Oct. 25, 2012    (DE) .......................... 10 2012 020 952

(51) Int. Cl.
*H02K 7/18*         (2006.01)
*H02N 11/00*        (2006.01)
(Continued)

(52) U.S. Cl.
CPC ............. *H02N 11/006* (2013.01); *F02G 5/02* (2013.01); *F03G 3/00* (2013.01); *H02K 7/1807* (2013.01); *H02N 10/00* (2013.01)

(58) Field of Classification Search
CPC .... H02K 7/1807; H02N 10/00; H02N 11/006; F02G 5/02
(Continued)

(56) References Cited

U.S. PATENT DOCUMENTS 3,743,866 A * 7/1973 Pirc .................. H02N 10/00
                                                 310/306
5,714,829 A * 2/1998 Guruprasad ........... H02N 10/00
                                                 310/306
(Continued)

FOREIGN PATENT DOCUMENTS

DE          1763508 B1      12/1971
DE          2838421 A1       3/1980
(Continued)

OTHER PUBLICATIONS

English translation of the Written Opinion of the International Searching Authority dated Jun. 25, 2014 for PCT Application No. PCT/EP2013/072256, 7 pages.
(Continued)

*Primary Examiner* — John K Kim
(74) *Attorney, Agent, or Firm* — Ohlandt, Greeley, Ruggiero & Perle, L.L.P.

(57) ABSTRACT

A device for generating a movement is provided. The device has at least one magnet and a material that is arranged in the proximity of the magnet or in the magnet. The magnet exerts an attractive force on the material. The attractive force of the magnet is weakened by thermal action on at least one region of the material. The material is preferably not in superconductive state during the thermal action. Preferably, the material also has paramagnetic properties prior to the thermal action but diamagnetic properties after the thermal action. Also preferably, the device generates a circular movement.

26 Claims, 17 Drawing Sheets

(51) Int. Cl.
*F02G 5/02* (2006.01)
*F03G 3/00* (2006.01)
*H02N 10/00* (2006.01)

(58) Field of Classification Search
USPC .......................................................... 310/306
IPC .............. H02K 7/18; H02N 11/00; F02G 5/02
See application file for complete search history.

(56) References Cited

U.S. PATENT DOCUMENTS

| | | | | |
|---|---|---|---|---|
| 2002/0046565 | A1* | 4/2002 | Singh | F03G 7/00 |
| | | | | 60/527 |
| 2005/0062360 | A1* | 3/2005 | Yabuta | H01L 37/04 |
| | | | | 310/306 |
| 2008/0012432 | A1* | 1/2008 | Togare | H02K 7/075 |
| | | | | 310/24 |
| 2010/0148611 | A1* | 6/2010 | Wang | H02K 1/14 |
| | | | | 310/156.37 |
| 2011/0062821 | A1* | 3/2011 | Chang | H02N 11/002 |
| | | | | 310/306 |
| 2012/0067050 | A1* | 3/2012 | Yamazaki | F03G 7/00 |
| | | | | 60/721 |
| 2012/0113594 | A1* | 5/2012 | Goettert | H02N 10/00 |
| | | | | 361/699 |
| 2015/0333662 | A1* | 11/2015 | Vida | H02N 11/006 |
| | | | | 310/306 |

FOREIGN PATENT DOCUMENTS

| | | |
|---|---|---|
| EP | 2143151 B1 | 12/2011 |
| GB | 2240433 A | 7/1991 |
| JP | S57191476 A | 11/1982 |
| JP | H01194875 A | 8/1989 |
| JP | H06141572 | 5/1994 |
| JP | H09184473 A | 7/1997 |
| JP | 2002281774 | 9/2002 |

OTHER PUBLICATIONS

English translation of the International Preliminary Report on Patentability dated Apr. 28, 2015 for PCT Application No. PCT/EP2013/072256, 9 pages.

International Search Report dated Jun. 25, 2014 for PCT application No. PCT/EP2013/072256.

* cited by examiner

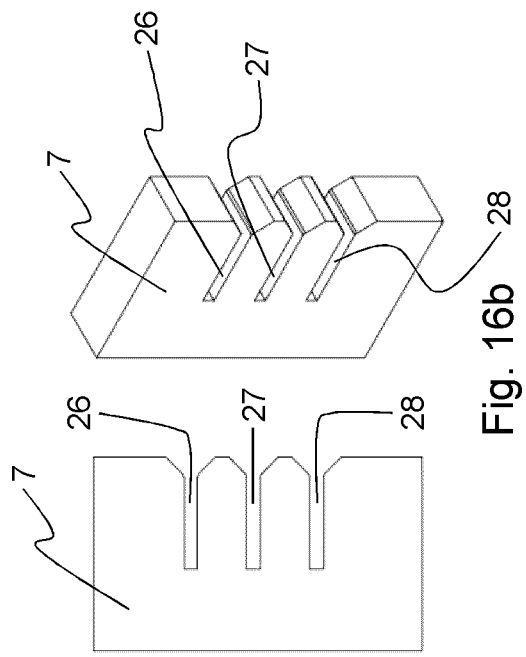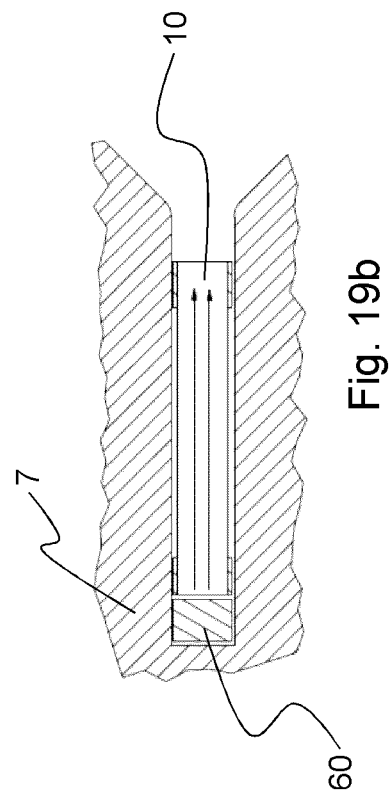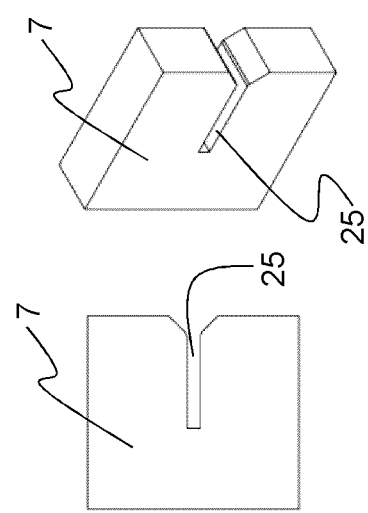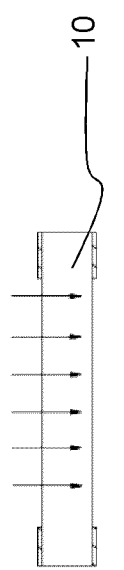

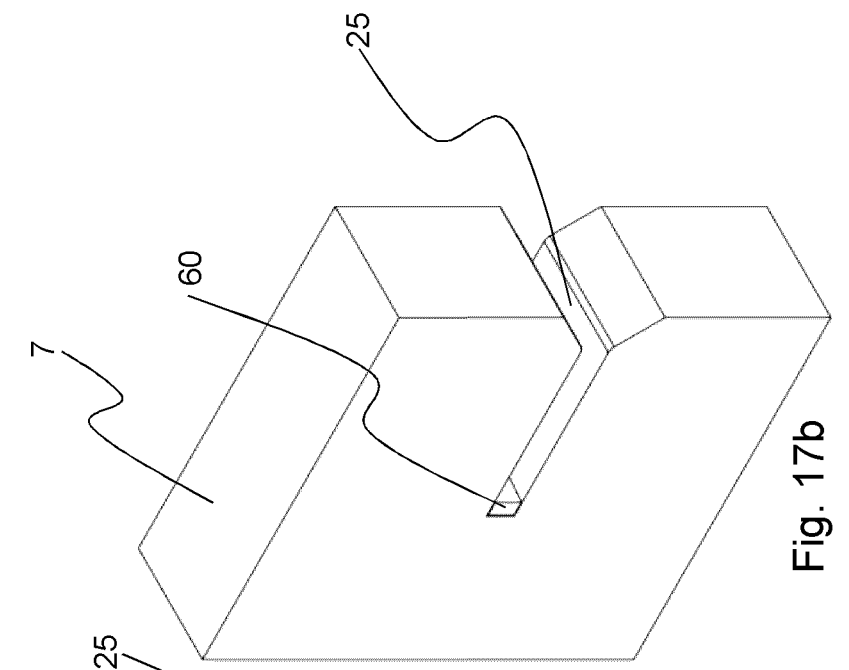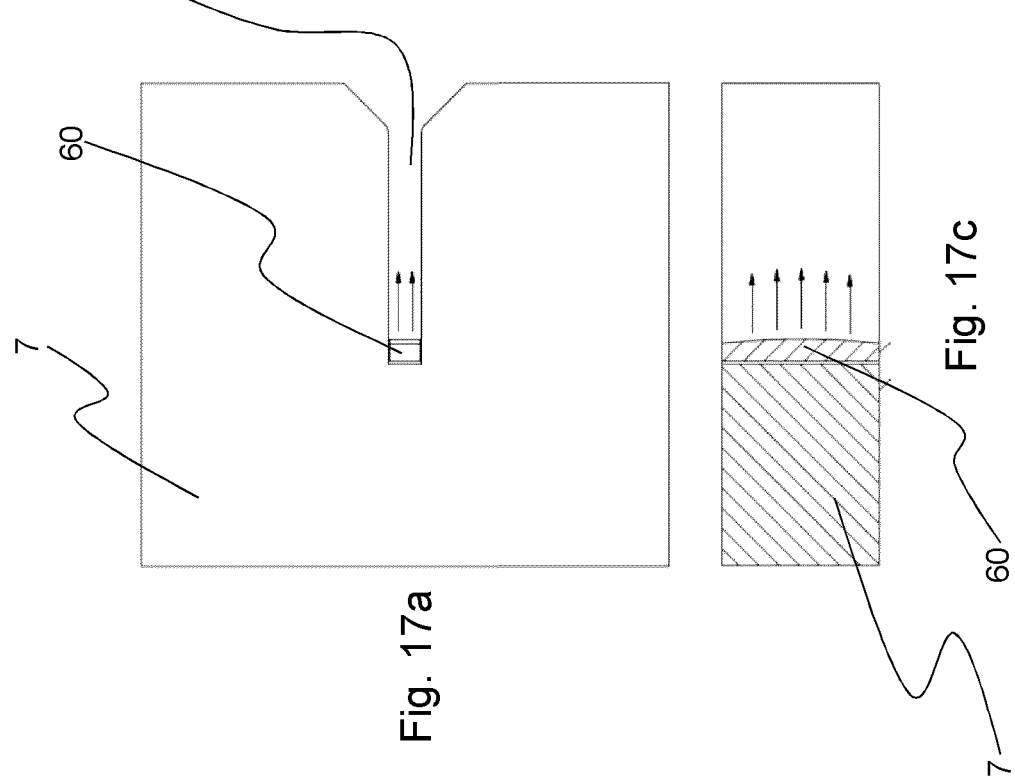

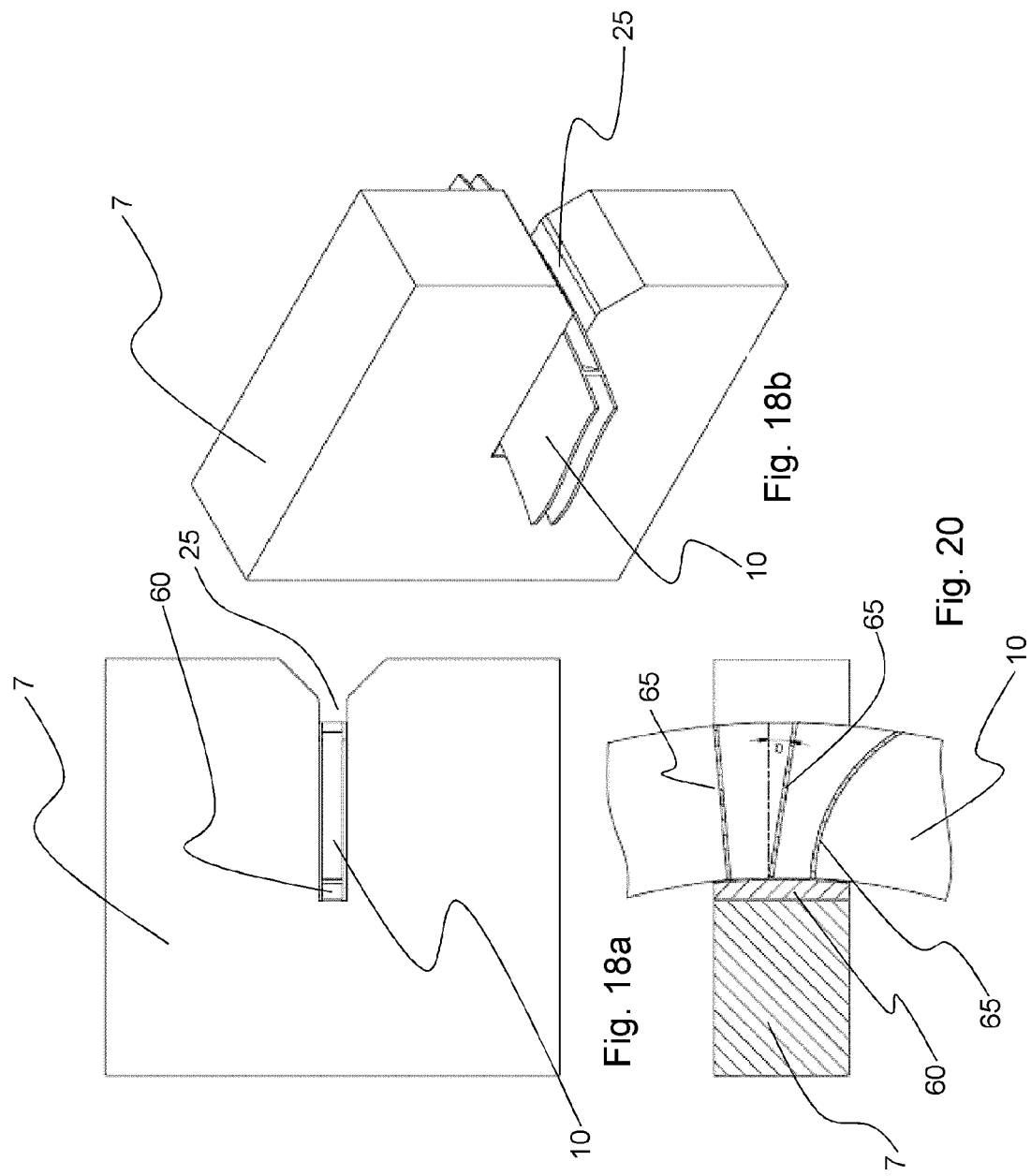

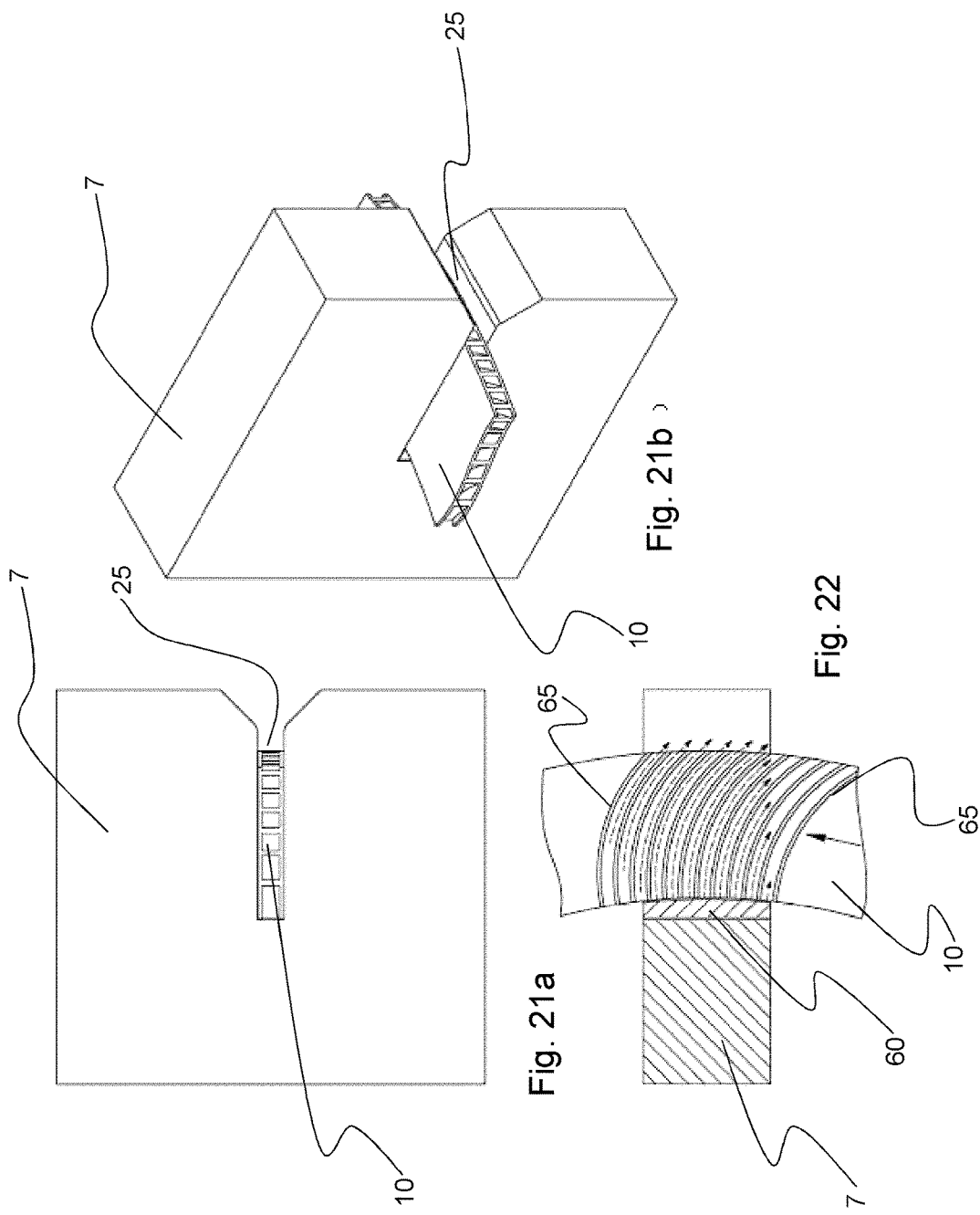

DEVICE FOR GENERATING A MOVEMENT, MOTOR COMPRISING SAID DEVICE AND USE OF THE LATTER

FIELD OF THE INVENTION

The invention relates to a device for generating a movement, a motor comprising such a device, a generator comprising such a device, and use of the latter.

BACKGROUND OF THE INVENTION

The generation of movements has always been of great importance, in particular engine-driven generation which means the generation by combustion engines. However, conventional internal combustion engines such as gasoline, diesel, Stelzer and Wankel engines require high temperature differences of a heat carrier in order to function effectively. With regard to the Carnot cycle, it can even be said that the larger the temperature difference, the more effectively an internal combustion engine works.

With regard to the growing scarcity of fossil energy carriers and the ever increasing energy demand, however, there is an ever increasing demand for motors which are usable and preferably efficiently usable already at lower temperature differences than those occurring in combustion processes.

DE 1 763 508 A1 describes a pyromagnetic motor which comprises a ferromagnetic material which is attracted by a magnet and heated by a candle, thereby causing a movement due to a change of magnetic permeability by radiant heat of a candle bulb. A decoration device is proposed as an application, in which the ferromagnetic material rotates around the candle bulb.

EP 2 14 3 151 B1 describes a device for converting thermal energy into electrical energy, comprising a magnetic circuit which comprises at least a portion made of a magnetic material, temperature-varying means for varying the temperature in the portion made of the magnetic material alternately above and below a phase transition temperature of the magnetic material to thereby vary the reluctance of the magnetic circuit, a coil which is arranged around the magnetic circuit in which electric energy is induced in response to a varying magnetic flux in the magnetic circuit, a capacitor which is connected in parallel with the coil to thereby form a resonant circuit, wherein the frequency of the temperature variation above and below the phase transition temperature and the resonance frequency of the resonant circuit optimize the resonant energy transfer to the resonance circuit. The generation of a movement is not disclosed.

JP 000001194875 A1 describes a motor in which a superconductive paramagnetic rotor is moved by a magnet due to the fact that in the region of the magnet the superconductive rotor is transferred from its paramagnetic state into its diamagnetic state by means of a heating device.

GENERAL DESCRIPTION OF THE INVENTION

The object of the invention is to provide a device for generating a movement, and a motor comprising such a device and a generator comprising such a device, in which even small temperature differences are suitable for generating a movement, and which can advantageously be operated at temperatures above the temperature of superconductors without compelling reason to use fossil fuels.

This object is achieved by a device for generating a movement, preferably a circular movement, comprising at least one magnet and a material arranged in the proximity of the magnet or in the magnet, on which material the magnet exerts an attractive force and in which the attractive force of the magnet is weakened by thermal action on at least one region of the material, wherein the material is preferably not in superconductive state during the thermal action and preferably has paramagnetic properties prior to the thermal action and diamagnetic properties after the thermal action.

According to the invention, materials having paramagnetic properties even refer to materials that have paramagnetic properties in regions thereof. According to the invention, materials having diamagnetic properties even refer to materials that have diamagnetic properties in regions thereof. Although it is advantageous according to the invention to have preferably completely paramagnetic and diamagnetic states, the invention may however even be implemented if not the complete material is provided in the paramagnetic or diamagnetic state.

Advantageously, the magnet forms a yoke which at least partially surrounds the material to improve the transfer of force between magnet and material.

If a first means for changing the temperature of the material is arranged within or in the proximity of the magnet, this means can be used to weaken the attractive force of the magnet by thermal action, and the material on the side having the higher attractive force may be pulled to or into the magnet before the thermal action, and may move away from or out of the magnet with diminished attractive force.

If the first means for changing the temperature of the movable material allows a thermal energy carrier, in particular a thermal energy carrier comprising radiation, to come into contact with the material, it is possible to favorably use solar or radiation energy in this manner, for example.

If the first means for changing the temperature of the movable material brings a thermal energy carrier in contact with the material, in particular a fluid thermal energy carrier, it is possible to use water, water-air mixtures, in particular sewage, exhaust air, and/or even exhaust gases for operating the device.

Preferably, using the first means for changing the temperature of the movable material the temperature of the material is raised above its Curie temperature, at least in regions thereof, preferably within the yoke of the magnet, by means of the thermal energy carrier, and in this manner a highest possible force difference is generated between the attractive force to or into the magnet and the force which prevents the material from escaping or moving away from the magnet.

Using a second means for changing the temperature of the material, which is arranged in the proximity of the magnet, the material may be re-cooled, in particular below the Curie temperature thereof, and a plurality of magnets with respective first and second means for changing the temperature may be used at short distances from each other.

Preferably, the second means for changing the temperature of the material is arranged in a region in which the magnetic field has dropped to a value of less than 50%, preferably less than 10%, and most preferably less than 1% relative to the maximum field within the yoke of the magnet.

Preferably, the second means for changing the temperature of the movable material brings a thermal energy carrier in contact with the material, in particular a fluid thermal energy carrier, and in this manner the material can be cooled efficiently. In this case, for example when exploiting geothermal heat, a hot water source and a cold water source may be used for local energy generation, or sewage from the chemical industry, from power plants, in particular from thermal power plants, or sewage may be used together with cooling water from natural sources.

When the second means for changing the temperature of the movable material is used to lower the temperature of regions and in particular of the heated regions of the material below the Curie temperature thereof using the thermal energy carrier, a second magnet with respectively associated first and second means for changing the temperature may be used already substantially immediately downstream thereof.

Preferably, the material is movable relative to the magnet and is preferably arranged to be movable or rotatable on a circular path in order to already exploit a usable torque generated by the circular movement, for example for use as a motor, or for moving a shaft of an electric generator.

More preferably, the material has an annular shape and the magnet preferably has openings for allowing the material to pass therethrough. Small gap dimensions in axial direction, preferably of less than 1 mm, provide for a particularly advantageous force effect. Most preferably, the distance of the surface of the ring 10 to the yoke of the magnet is less than 0.7 mm.

If the material comprises gadolinium, the Curie temperature of between 16° C. and 17° C. thereof already allows the use of the device with heat carriers which have a temperature of more than about 17° C. If higher temperatures of the heat carrier are available, the latter may accordingly be guided more quickly past the material, in particular past the gadolinium, so that the material is just reliably heated above its Curie temperature and thus becomes diamagnetic, at least in regions thereof. The heat carrier which has only partially cooled may subsequently either be fed to another means for changing the temperature associated with another magnet within the device of the invention if a plurality of magnets are provided in the device, or may be fed to another device of the invention.

Preferably, the material is metallic gadolinium having a purity of at least 99.995 wt %.

Advantageously, the magnet is a permanent magnet and the device comprises a plurality of such magnets and a plurality of first and second thermal means.

In order to enable an axial cascading of a plurality of devices, the devices preferably comprise a central bearing and a shaft for taking up the torque generated by the material, and this shaft is axially connectable to the shaft of a further device.

More advantageously, the feed and discharge conduits of the first and/or second means for changing the temperature are arranged laterally, so that towers may be formed from a plurality of devices according to the invention and the usable torque may be significantly increased in this way.

Preferable and more preferable applications of the device may be found, for example, as an energy converter in power plants, for exploiting waste heat of chemical reactions, in fossil fuel exploitation facilities even with flaring.

A mobile use is also possible, for example when using the device for exploiting waste heat of internal combustion engines, in particular waste heat of exhaust gases of internal combustion engines or heat of the liquid cooling medium of the internal combustion engine.

A particularly preferable application comprises the use of the device for exploiting household waste heat, in particular waste heat of exhaust gases from heating and air conditioning equipment.

The invention will now be explained in more detail by way of preferred exemplary embodiments and with reference to the appending drawings.

BRIEF DESCRIPTION OF THE DRAWINGS

In the drawings:

FIG. 16a is a side view and a perspective view of the magnet of the device according to the invention, with one yoke;

FIG. 16b is a side view and a perspective view of the magnet of the device according to the invention, with three yokes;

FIG. 17a is a side view of the magnet of the device according to the invention, with nozzles;

FIG. 17b is a perspective view of the magnet of the device according to the invention, with nozzles;

FIG. 17c is a side view of a detail of the magnet of the device according to the invention, with nozzles, wherein the flow direction of the fluid in the ring is indicated by arrows for the case that the illustrated region of the ring is located in the yoke;

FIG. 18a is a side view of the magnet of the device according to invention, with a ring inserted into the yoke;

FIG. 18b is a perspective view of the magnet of the device according to the invention, with a ring inserted into the yoke;

FIG. 19a shows the flow direction of the fluid within the ring for the case that the illustrated region of the ring is outside the magnet;

FIG. 19b is a sectional side view of a detail of the magnet of the device according to the invention, with nozzles and with a ring inserted into the yoke;

FIG. 20 is a sectional view through the magnet of the device according to the invention at the level of the yoke, with the ring inserted;

FIG. 21a is a side view of the magnet of the device according to the invention, with inserted ring which comprises a plurality of passages extending in flow direction;

FIG. 21b is an perspective view of the magnet of the device according to the invention, with inserted ring which comprises a plurality of passages;

FIG. 22 is a sectional view through the magnet of the device according to the invention at the level of the yoke, with inserted ring which comprises a plurality of radially extending passages;

DETAILED DESCRIPTION OF PREFERRED EMBODIMENTS

In the detailed description of preferred embodiments which follows reference will be made to the figures which are not true to scale, for the sake of clarity. For a better understanding, the directions mentioned below are defined as follows.

In the following description, axial direction is defined as a direction in axial direction of the output shaft of the device. In the following description, radial direction is defined as a direction radially pointing away from the center of the output shaft of the device and extending perpendicularly to the axial direction. Tangential direction is defined as a direction which extends perpendicularly to the axial and radial directions. For the straight line extending along the center of the output shaft in axial direction this direction coincides with the radial direction and therefore is only used for subjects outside the center of the output shaft.

Figure 1:
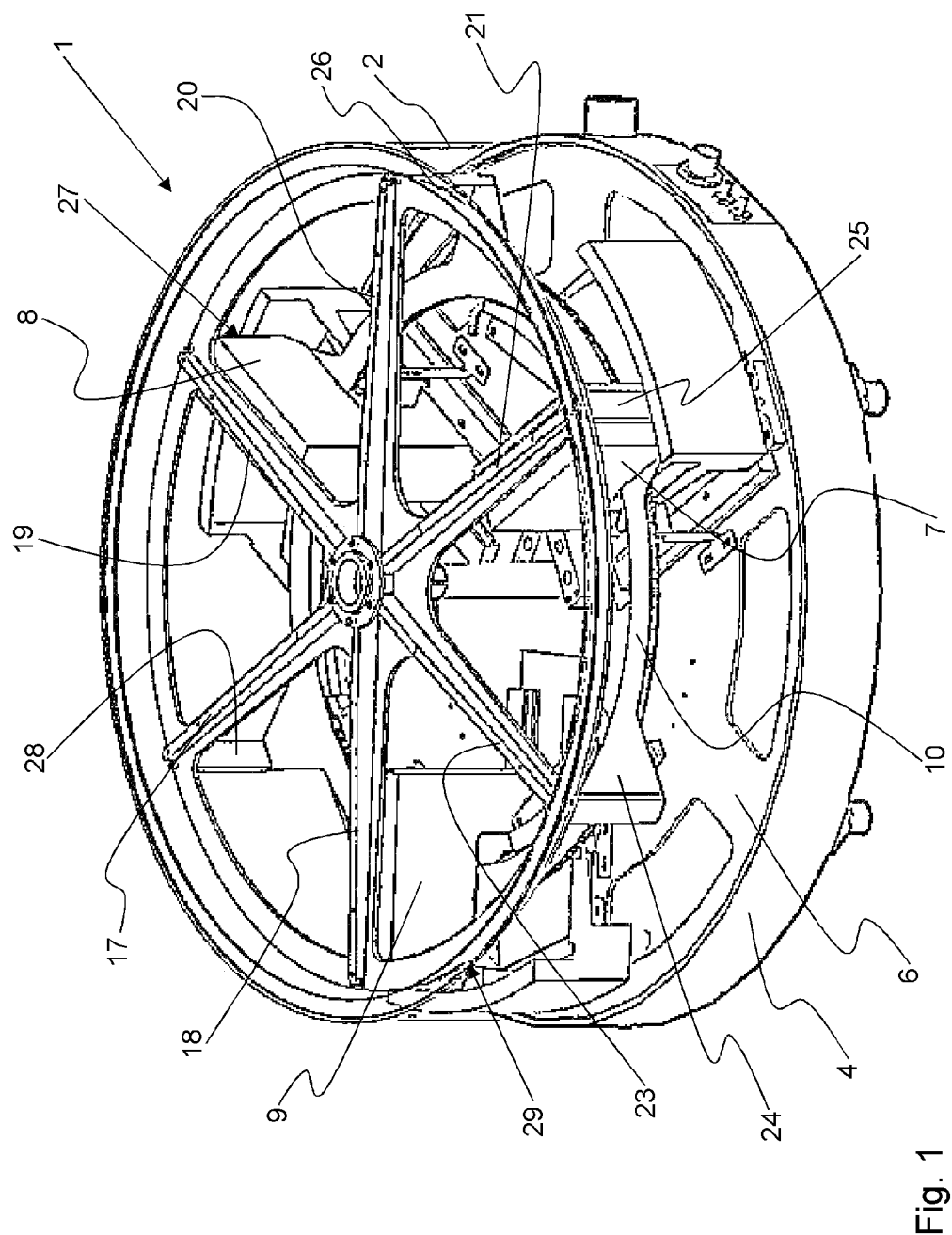
FIG. 1 is a perspective view of a preferred embodiment of the device according to the invention from above, with a casing illustrated to be transparent and with a cover part removed.

Reference is now made to FIG. 1 which shows a perspective view of a preferred embodiment of a device 1 according to the invention from above, with a casing 2 illustrated to be transparent, and with a cover part 3 removed.

Casing 2, cover part 3, and bottom group 4 form an encapsulation for the assemblies arranged therein, which encapsulation substantially protects from splashing water or is substantially fluid-tight in a preferred embodiment.

An output shaft 5 extends through cover part 3 in axial direction, and in a preferred embodiment further extends through bottom group 4. The output shaft extends axially through the device 1 of the invention. In the usual way, output shaft 5 may serve as a torque generating motor, or with an electric generator connected directly to the output shaft, it may serve as a generator of electric energy. Generally, any electric generator that is capable of converting rotary movements into electric energy can be operated by the device according to the invention.

In a further preferred embodiment, a plurality of devices according to the invention are arranged on top of each other in the axial direction, and the output shafts thereof are connected for co-rotation with each other.

In this embodiment, the discharge conduits of a respective upper device according to the invention may moreover be connected to the feed conduits of a respective device according to the invention arranged below. In this case, the fluid heat carrier of a respective upper device, which has only partially cooled may flow into the respective device arranged below and may cool further, so that a substantially higher proportion of thermal energy of the heat carrier is exploited and a substantially higher torque is generated.

Bottom group 4 comprises a bottom plate 6 on which three magnets 7, 8, and 9 are arranged.

Magnets 7, 8, and 9 each form a yoke through which a ring extends, with a small spacing to the yoke, which ring is connected to output shaft 5 so as to co-rotate therewith. This is illustrated in FIGS. 21a and 21b which show magnet 7 having a yoke 25, and a ring 10 extending therein, in a side elevational view and a perspective side view.

Ring 10 consists of a material on which the magnet exerts an attractive force and in which this attractive force of the magnet is weakened by thermal action. Examples for such materials are paramagnetic materials which become substantially diamagnetic when being heated above their Curie temperature, and which become substantially paramagnetic when being cooled below their Curie temperature.

Representative for magnets 7, 8, and 9, FIG. 16a shows a magnet 7 in a side elevational view and in a perspective side view. Magnet 7 has one yoke 25.

In preferred embodiments, magnets 7, 8, and 9 may each include more than one yoke. For example, FIG. 16b shows a magnet 7 having three yokes 26, 27, and 28 arranged one above the other, in a side elevational view and in a perspective side view.

A particularly preferred material in the ring comprises gadolinium, or even consists of gadolinium.

Most preferably, the material is metallic gadolinium having a purity of at least 99.995%, which has a Curie temperature of approximately 16.6 degrees Celsius.

The attractive force of the magnet is weakened by thermal action on at least one region of the material, i.e. a region of the gadolinium in this case, wherein the material gadolinium is preferably not in a superconductive state during the thermal action and preferably has paramagnetic properties prior to the thermal action and diamagnetic properties after the thermal action.

Small dimensions of the gap in axial direction between the surface of ring 10 and the surface of the yoke of magnets 7, 8, and 9 of preferably less than 1 mm provide for a particularly advantageous force effect. Most preferably, the spacing between the surface of ring 10 and the yoke of the magnet is less than 0.7 mm.

Preferably, magnets 7, 8, and 9 are permanent magnets, each comprising lateral shielding 11 and 12 preferably consisting of magnetic shielding plates, as can be best seen from FIGS. 10 to 13.

Figure 10:
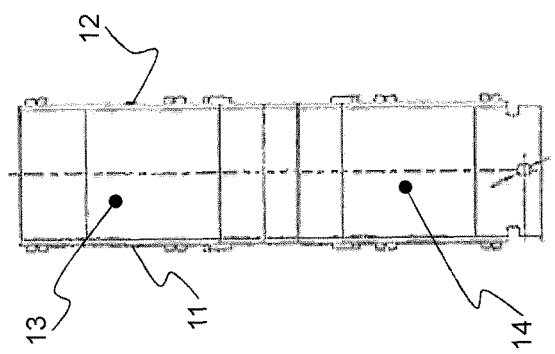
FIG. 10 is an elevational view of a magnet of the device according to the invention as seen in radial direction towards the device.

FIG. 10 is an elevational view of magnet 7 which is substantially similar to magnets 8 and 9 and is described below by way of example.

In this figure, magnet 7 is illustrated as seen in radial direction looking towards the device.

Figure 12:
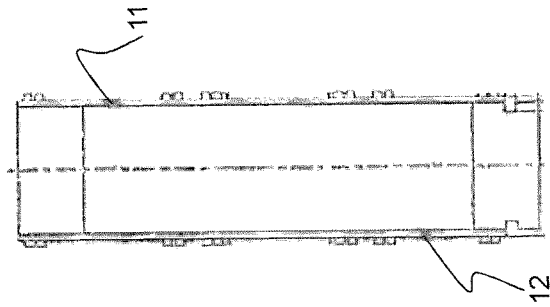
FIG. 12 is an elevational view of the magnet illustrated in FIGS. 10 and 11 in negative radial direction, i.e. looking away from the device.
Figure 11:
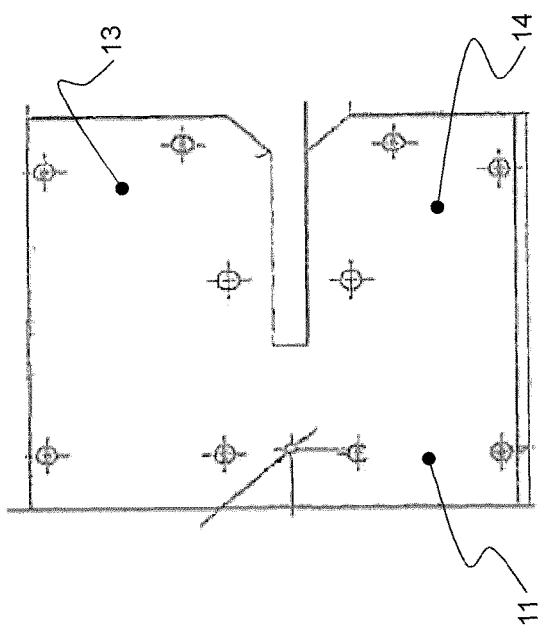
FIG. 11 is a side elevational view of the magnet illustrated in FIG. 10, i.e. a view of the magnet in a tangential direction.
Figure 13:
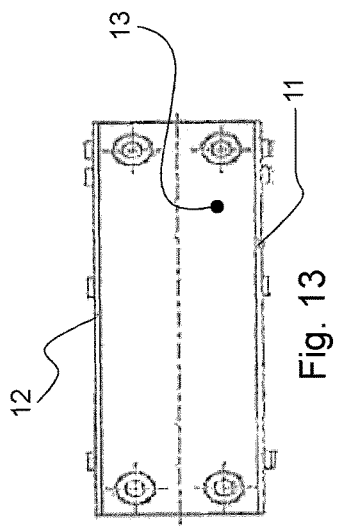
FIG. 13 is a top plan view of the magnet illustrated in FIGS. 10, 11, and 12.

FIG. 11 is a side view of magnet 7, that means a view of the magnet as seen in a tangential direction. FIG. 12 is a view of magnet 7 as seen in negative radial direction, i.e. when looking away from the device. FIG. 13 is a top plan view of magnet 7.

Shielding plates 11 and 12 consist of a magnetically particularly well conducting metal and confine the magnetic field in the region between the two arms 13 and 14 of the yoke of magnets 7, 8, and 9.

Figure 14:
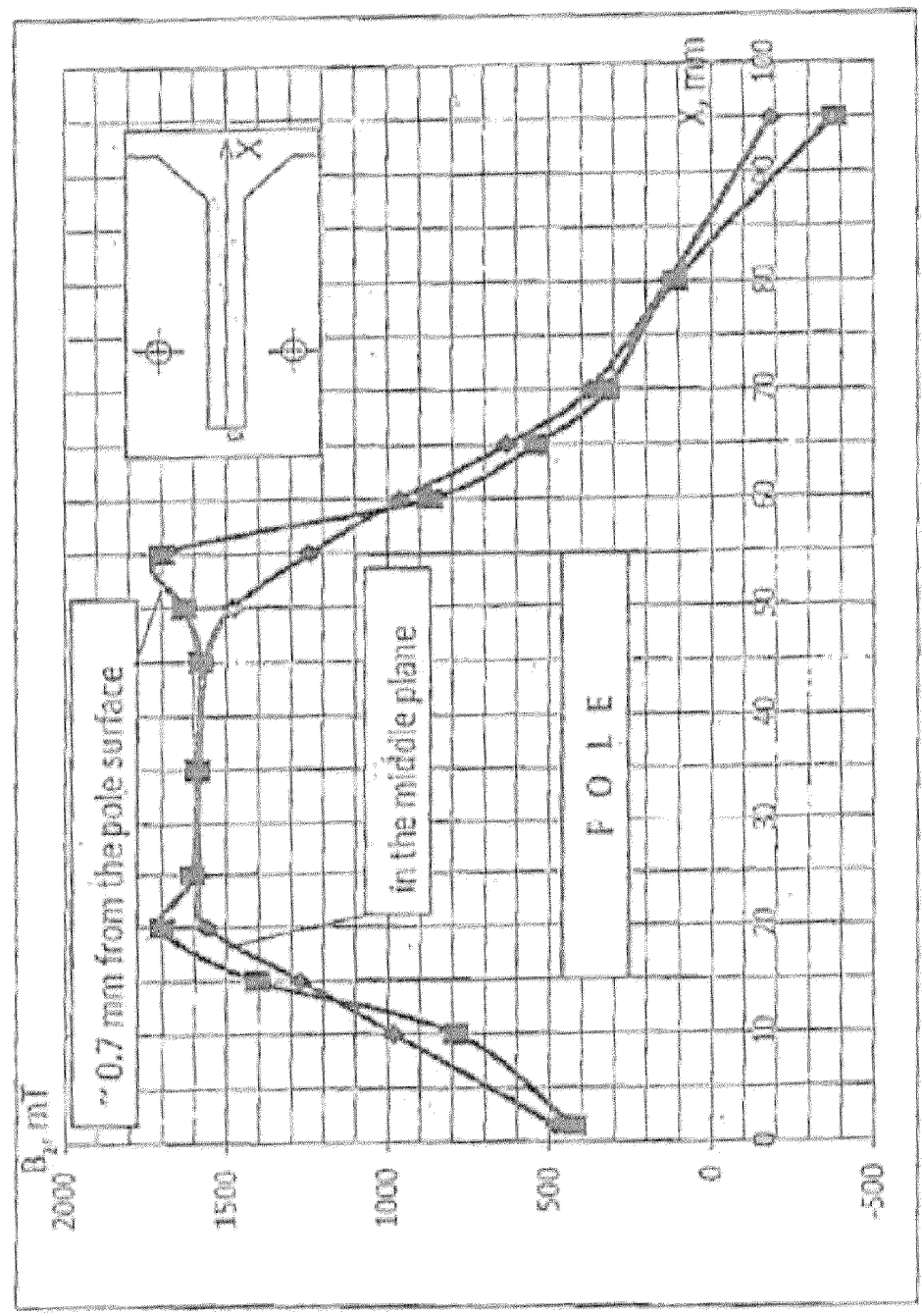
FIG. 14 is a plot of curves of the magnetic field in a magnet of the device according to the invention within the pole pieces of the magnet, taken in radial direction, at a distance of approximately 0.7 mm from the pole piece for one curve, and for the other curve along an axially middle plane between the pole pieces, wherein each of the two measurements were made in the middle between the pole pieces in tangential direction.
Figure 15:
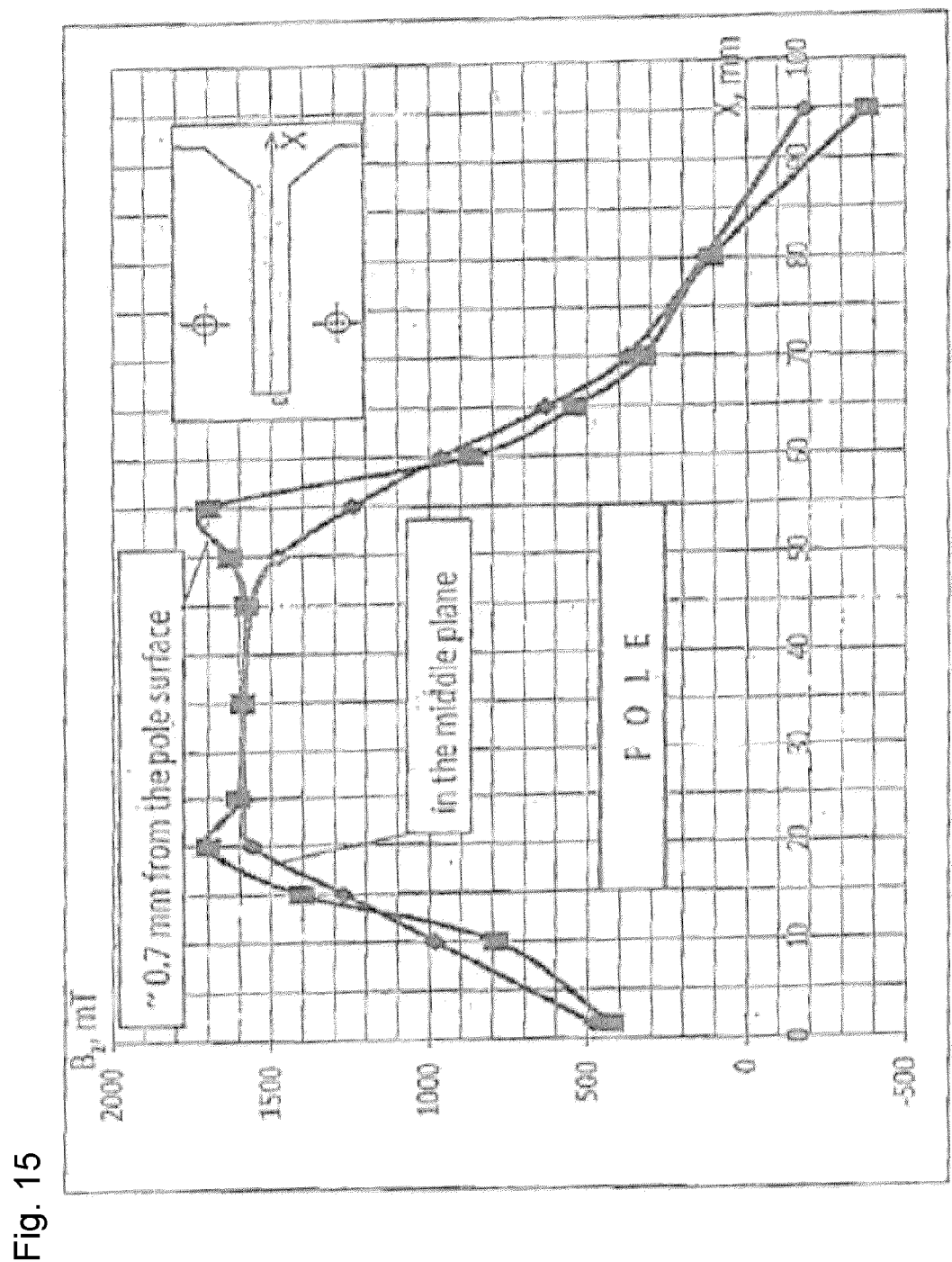
FIG. 15 is a plot of curves of the magnetic field in a magnet of the device according to the invention within the pole pieces of the magnet, taken in tangential direction, at a distance of approximately 0.7 mm from the pole piece for one curve, and for the other curve along an axially middle plane between the pole pieces, wherein each of the two measurements were made radially approximately in the middle between the pole pieces.

FIGS. 14 and 15 show the strength of the magnetic field resulting between arms 13 and 14 and hence within the yoke.

FIG. 14 illustrates the shape of the magnetic field in a magnet of the device according to the invention within arms 13 and 14 of magnet 7, which are also referred to as pole pieces, taken in radial direction, at a distance of approximately 0.7 mm from the respective arm 13, 14 for one curve, and for the other curve along an axially middle plane between arms 13, 14, wherein each of the two measurements were taken approximately in the middle in tangential direction between arms 13, 14.

FIG. 15 illustrates the shape of the magnetic field in a magnet of the device according to the invention within arms 13, 14 of the magnet taken in tangential direction, at a distance of approximately 0.7 mm from arm 13, 14 for one curve, and for the other curve along an axially middle plane between the arms, wherein, moreover, each of the two measurements were taken radially approximately in the middle between the arms.

As can be seen clearly from these figures, the magnetic field is concentrated very strongly between arms 13 and 14 and has a pronounced plateau between arms 13 and 14.

In the illustrated embodiment, the magnetic field in the region of this plateau exhibits a flux density of between approximately 1500 mT and 1800 mT, and in the center of approximately 1600 mT.

According to the invention, the values of the magnetic flux density are not limited and may preferably be greater than 1.6 T, more preferably greater than 10 T, and most preferably greater than 20 T.

Due to the steep drop of the magnetic field, the influence thereof can be spatially confined and a particularly favorable force characteristic is achieved with respect to ring 10, as will be described below with reference to FIG. 3. FIG. 3 shows a detail of a sectional view of the device according to the invention illustrated in FIG. 2, taken along a radial plane which is spanned by lines A and A'.

Ring 10 extends between arms 13, 14 of magnet 7 and is mounted for rotation around output shaft 5 and may therefore rotate freely in yoke 25 of magnet 7.

If device 1 is in thermal equilibrium, that is to say when all the components thereof have approximately the same temperature, ring 10 remains at rest and does not rotate.

However, if a thermal energy carrier is supplied by a feed conduit 15, for example a fluid thermal energy carrier, the material of ring 10 may be heated by this energy carrier, and since this energy carrier is supplied in the magnet or at least in the proximity of the magnet, the material of ring 10 is heated in this region and a transition from the paramagnetic to the diamagnetic state takes place when the Curie temperature is exceeded. In its diamagnetic state the magnet loses its attractive force, and the paramagnetic portion of ring 10 will be steadily pulled into magnet 7 and can leave the magnet without attractive force after having been heated.

In this manner, a torque is generated that is transferred to output shaft 5, by support arms 17 to 23 via respective supports 24 to 29.

To ensure a particularly good heat input, ring 10 may comprise radially extending ribs 16 between which respective openings are defined which form passages 65 for passing the thermal energy carrier.

FIGS. 23*a*, 23*b*, 23*c*, and 23*d* each show a radial elevational view and a perspective sectional view, illustrating radially extending ribs 16 and passages 65 extending between these ribs 16, with only one passage being designated by reference numeral 65 in each case, for the sake of clarity.

Figure 23D:
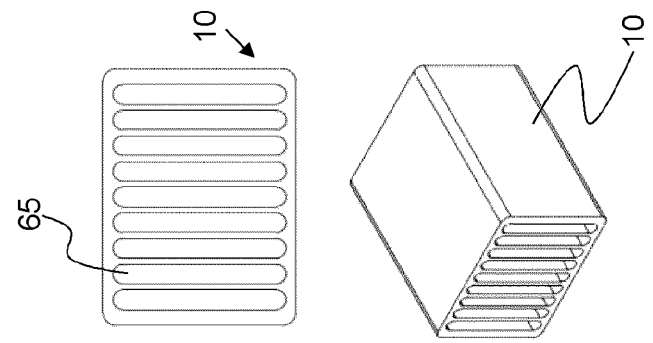
FIGS. 23a-23d each show a vertical sectional view through the ring and a perspective sectional view of the ring, with differently shaped ribs.
Figure 23C:
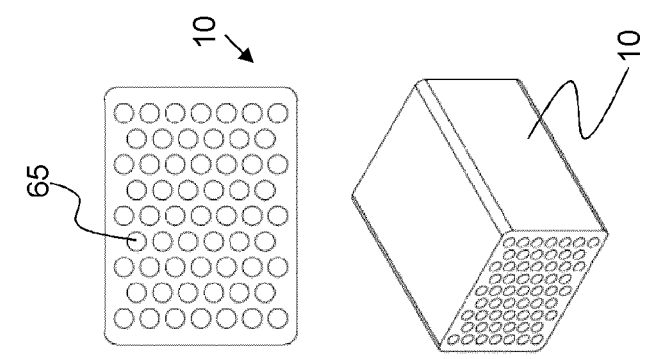
Figure 23B:
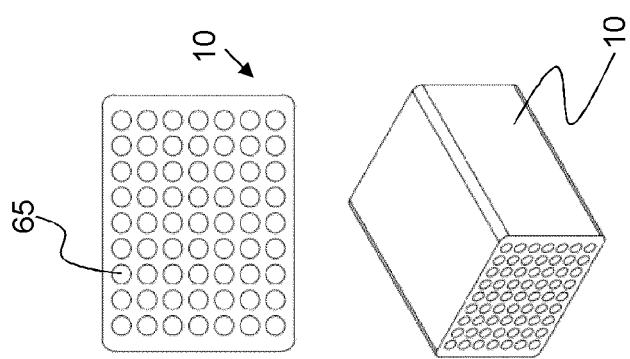
Figure 23A:
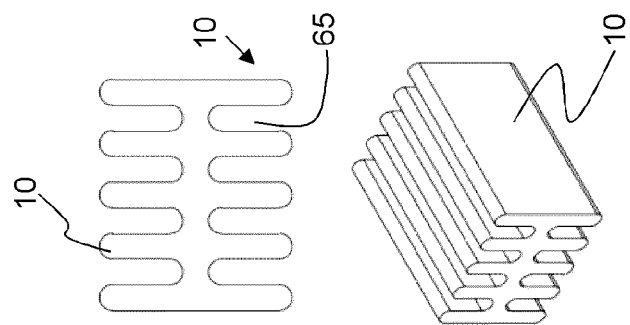

In case of the embodiment of FIG. 23*a*, ribs 16 of ring 10 have a substantially rib-shaped design. The surface which is available for heat exchange between the thermal energy carrier and ring 10 is enlarged significantly as compared to that of a ring having one cavity.

The passages 65 of the ring 10 according to FIG. 23*b* are aligned to each other vertically and horizontally, whereas passages 65 in FIG. 23*c* are staggered to each other.

The passages of the embodiment of the ring according to FIG. 23*d* comprise a plurality of axially extending cavities arranged side by side.

The embodiment of the ring 10 according to FIG. 23*d* allows to feed the fluid thermal energy carrier to ring 10 in axial or vertical direction. After passing through ring 10 in substantially axial direction, the fluid thermal energy carrier is discharged from ring 10 on the bottom side thereof. To enable the axial flow direction, bores or holes are provided in the upper surface and lower surface of ring 10. In this manner, ring 10 may be heated or cooled at these locations, depending on the temperature of the supplied fluid.

FIG. 20 shows three different embodiments of the radial extension of passages 65. FIG. 20 is a sectional plan view through magnet 7 taken in radial direction at the level of the yoke, with ring 10 inserted in this yoke. The three extensions of passage 65 which are shown by way of example should be understood as alternatives. In the embodiment shown above, passage 65 extends in radial direction whereas passage 65 of the embodiment shown in the middle is inclined to the radial direction at an angle α. Passage 65 of the embodiment shown in the lower region of FIG. 20 is curved with respect to the radial direction. Each of these embodiments may be implemented in a ring of the invention without employing the other embodiments at the same time.

FIG. 22 shows an embodiment comprising a plurality of parallel passages 65 that are curved with respect to the radial direction. The arrows in passages 65 show the flow direction of the fluid thermal energy carrier in the interior of ring 10.

The fluid thermal energy carrier is supplied by means of nozzles 60 which are located at the inner rear side of yoke 25. The position of these nozzles in yoke 25 of magnet 7 is shown in FIG. 17*a* in a side elevational view and in FIG. 17*b* in a perspective side view, without the ring inserted into yoke 25.

FIG. 17*c* shows the flow direction of the fluid thermal energy carrier exiting from nozzles 60 of magnet 7, indicated by arrows.

FIG. 18*a* is a side elevational view illustrating magnet 7 and nozzles 60, with the ring 10 inserted into yoke 25 of magnet 7. The same situation is shown in FIG. 18*b* in a perspective side view, in which ring 10 comprises no passages 65 and no ribs 16 in the interior thereof, but only a continuous cavity.

FIG. 19*b* shows a detail of an axial sectional view through the yoke of magnet 7 with nozzles 60 and ring 10 inserted, wherein the arrows in FIG. 19b indicate the flow direction of the fluid thermal energy carrier when the illustrated region of ring 10 is located in the yoke of magnet 7.

There, the fluid thermal energy carrier flows substantially in radial direction. In the regions of ring 10, which are located outside the magnet or magnets, the fluid thermal energy carrier flows substantially in tangential direction, as shown in FIG. 19a.

Figure 24:
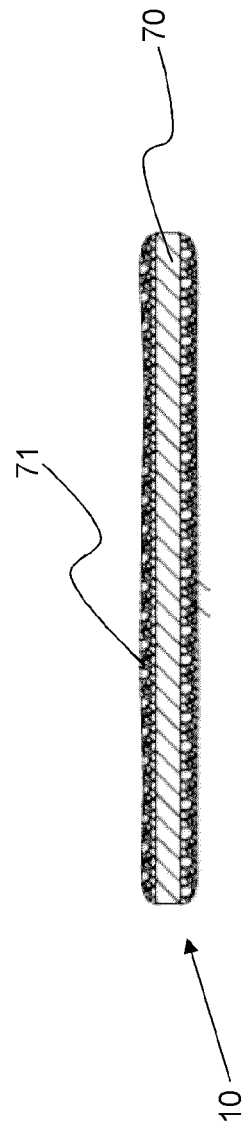
FIG. 24 is a vertical sectional view of one embodiment of the ring.

FIG. 24 shows an embodiment of ring 10 in which a substrate 70 is provided with a coating 71 in which particulate or powdered paramagnetic material is embedded, which is shown as being embedded and particulate in FIG. 24 by light particles surrounded by a darker plastic material.

All embodiments of ring 10 described above may comprise a coating 71 on the surfaces of the ring as described above. In such embodiments, the embodiment of ring 10 described above would correspond to substrate 70 on which coating 71 is then deposited.

Preferred materials for substrate 70 are plastics or metals, composite materials, in particular composite materials in which glass fibers and/or carbon fibers are embedded, in particular nano-sized carbon particles.

In one embodiment which is not shown in the figures, preferred materials for substrate 70 are plastics or metals, plastics with embedded particulate paramagnetic material, and composite materials with embedded particulate paramagnetic material, in particular composite materials in which glass fibers and/or carbon fibers are embedded, in particular nano-sized carbon particles, in particular in the manner described above for coating 71.

Besides the materials described above for coating 71 which comprises and in particular encloses or embeds the particulate paramagnetic particles, Wood's metal or Wood's alloy is used as an alternative, in which the paramagnetic material is embedded. Wood's alloy refers to a low-melting bismuth alloy into which the paramagnetic material is embeddable so that the material substantially does not lose its paramagnetic properties by the embedding process. This means in particular that the Curie temperature thereof changes by not more than 5 Kelvin, preferably by less than 1 Kelvin, and most preferably by less than 0.5 Kelvin.

Wood's metal comprises 50 wt % of Bi (bismuth), 25 wt % of Pb (lead), 12.5 wt % of Cd (cadmium), and 12.5 wt % of Sn (tin), for example. As an alternative to Wood's metal or Wood's alloy, a form of Rose's metal may be used for embedding the paramagnetic material. The composites described above are materials in which the paramagnetic material is provided in embedded form or in which the paramagnetic material is embedded in one of the substrate materials described above. The composites may either be provided as a coating, or the ring 10 itself may be made completely from these composites. In this manner, it is possible to incorporate an increased amount of paramagnetic material in ring 10.

Furthermore, in different regions the ring 10 may comprise different composite materials in which the paramagnetic material is embedded in order, for example to meet locally increased strength requirements in this way, by embedding different fibers or fiber materials and/or by providing different concentrations of embedded fibers or fiber materials.

An alloy as described above as Wood's metal, but without cadmium and instead thereof with 25% of Sn, is known as Rose's metal which melts at about 94° C.

In the embodiment with a substantially axial flow direction of the fluid thermal energy carrier, bores or holes are provided in the coating 71 of ring 10 in the upper and lower surfaces in order to allow feeding and discharge of the fluid thermal energy carrier.

A collecting basin 30 for the thermal energy carrier is located radially behind and below ring 10, from which the thermal energy carrier may be discharged from device 1 via discharge conduits 31 associated with the collecting basin.

In this way, a first means for changing the temperature of the material gadolinium is defined by supplying the thermal energy carrier via feed conduit 15 within or in the proximity of magnet 7.

Alternatively, the first means for changing the temperature of the movable material 10 may allow a thermal energy carrier comprising radiation to come into contact with material 10. For this purpose, instead of collecting basin optical radiation guides may be arranged in device 1 or in the proximity of device 1, which are not illustrated in the figures but known in the art, such as lenses, light guides, mirror systems, in particular parabolic mirrors focusing punctiform or circular radiation sources, inter alia.

In this embodiment, casing 2 may be transparent or may even be omitted.

To improve the absorption properties, the material of the ring may have an absorbing color adapted to the radiation or may be provided with a colored layer, or may comprise a black coating.

Irrespectively of the thermal energy carrier, however, the temperature of regions of the material 10 should be raised above the Curie temperature thereof, preferably by means of such a first means for changing the temperature of the movable material 10 and using the thermal energy carrier.

Figure 2:
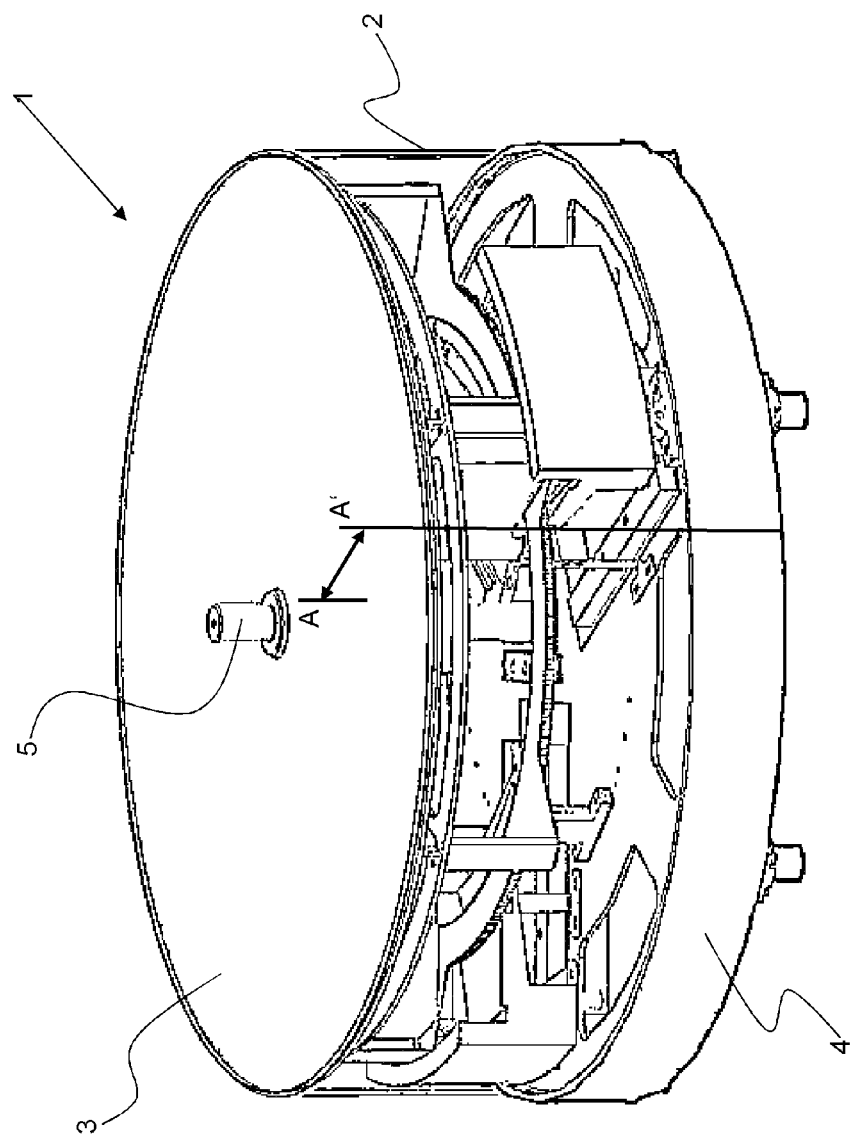
FIG. 2 shows the device of the invention illustrated in FIG. 1, with the cover part attached.
Figure 3:
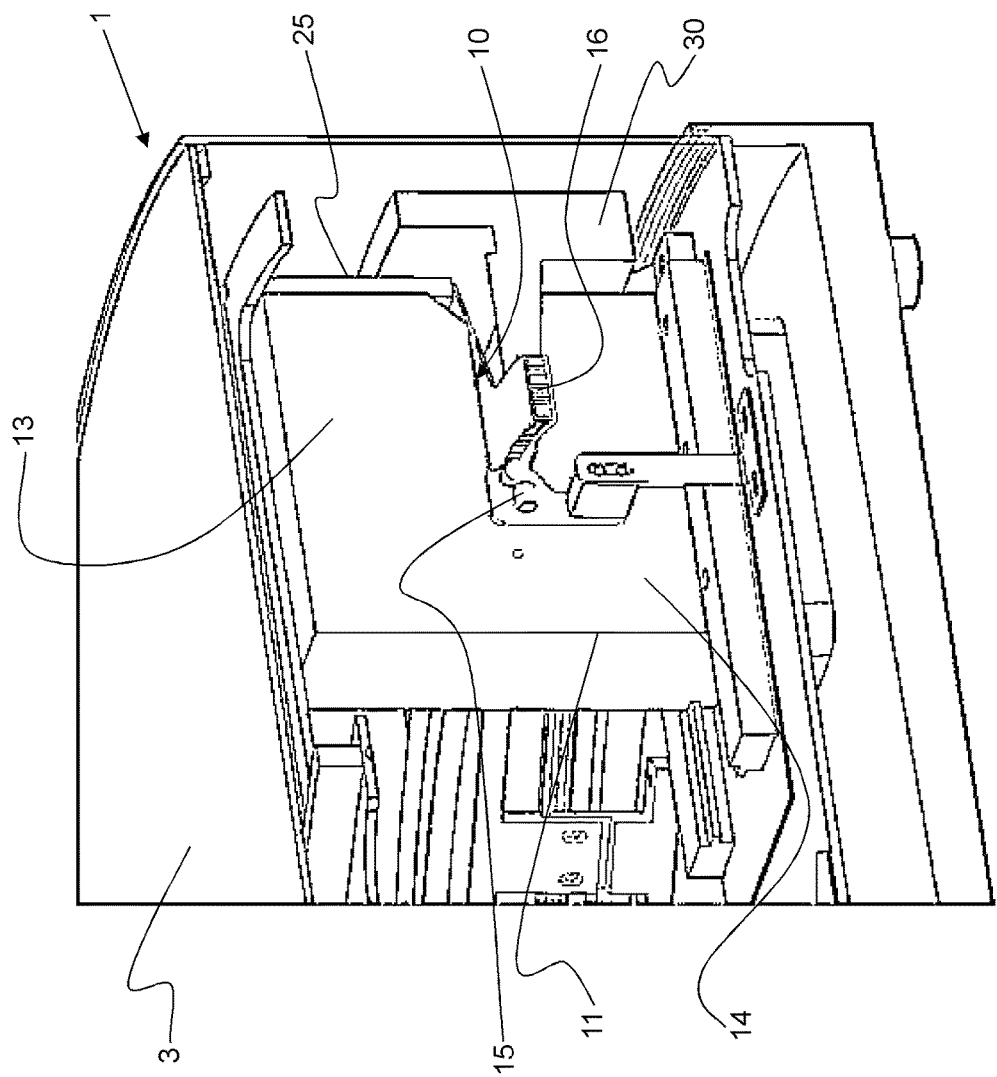
FIG. 3 shows a detail of a sectional view of the device according to the invention illustrated in FIG. 2, taken along a radial plane which is spanned by lines A and A'.
Figure 4:
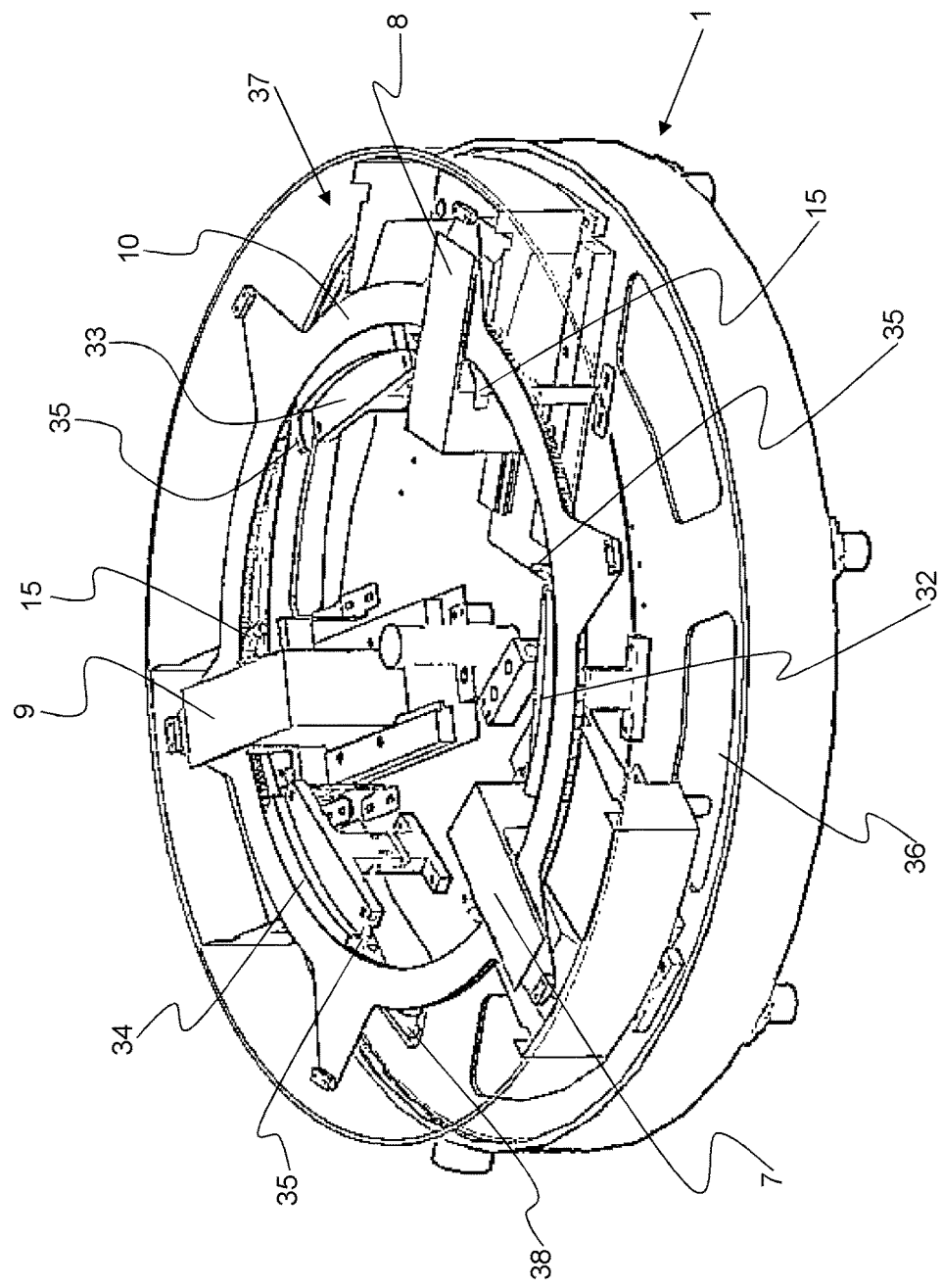
FIG. 4 is a perspective sectional view of the device according to the invention illustrated in FIG. 2 taken along a plane which extends perpendicularly to the output shaft of the device, from above.

Reference is now made to FIG. 4 which shows a sectional view of the device 1 according the invention illustrated FIG. 2 taken along a plane that extends perpendicularly to the output shaft of the device. A configuration which only comprises thermal means for increasing the temperature of regions of the material of ring 10 may already achieve considerable powers, and in this way powers of about 200 W per magnet may be obtained in the outer edge of a ring 10 having a diameter of approximately 70 cm, with the magnetic field of approximately 1600 mT as specified.

If the magnetic field is increased, substantially greater powers can be achieved, for example more than one kW per magnet.

Furthermore, larger diameters of ring 10, for example from one to several meters, will result in a greater torque and may be of advantage, depending on the application.

If by using such a first means for changing the temperature of movable material 10 the temperature of regions of the material 10 is raised by means of the thermal energy carrier, the heated regions may be cooled using a second, similar means, in particular using a fluid energy carrier at a lower temperature.

Such second means 32, 33, and 34 which in particular include a fluid energy carrier at lower temperature by means of which the heated regions of ring 10 are re-cooled are also shown in FIG. 4.

By means of feed conduits 35, a fluid energy carrier at a temperature below the Curie temperature of the material of ring 10 is supplied to second means 32, 33 and 34 and from there it is fed through ribs 16 of ring 10 in order to cool the ring below the Curie temperature thereof.

In this manner, the second means for changing the temperature of the movable material brings the thermal energy carrier, in particular the fluid thermal energy carrier, in contact with the material of ring 10, and the temperature of regions of the material of ring 10 is lowered below the Curie temperature thereof by means of the thermal energy carrier.

Each of the second means 32, 33, 34 is arranged in the proximity of a respective associated magnet 7, 8, 9, and in this way it is possible to direct the cooled material of ring 10 to the respective next magnet 8, 9, 7.

Each of the second means 32, 33, 34 is arranged in a region in which the magnetic field has dropped to a value of less than 50%, preferably less than 10%, and most preferably less than 1% relative to the maximum field within the yoke of magnet 7, 8, 9.

Behind or below second means 32, 33, 34, openings 36, 37, 38 are provided in bottom plate 6 of base group 4, which openings receive the thermal energy carrier after it has passed through ring 10, in particular through the openings defined by ribs 16 in ring 10.

Figure 5:
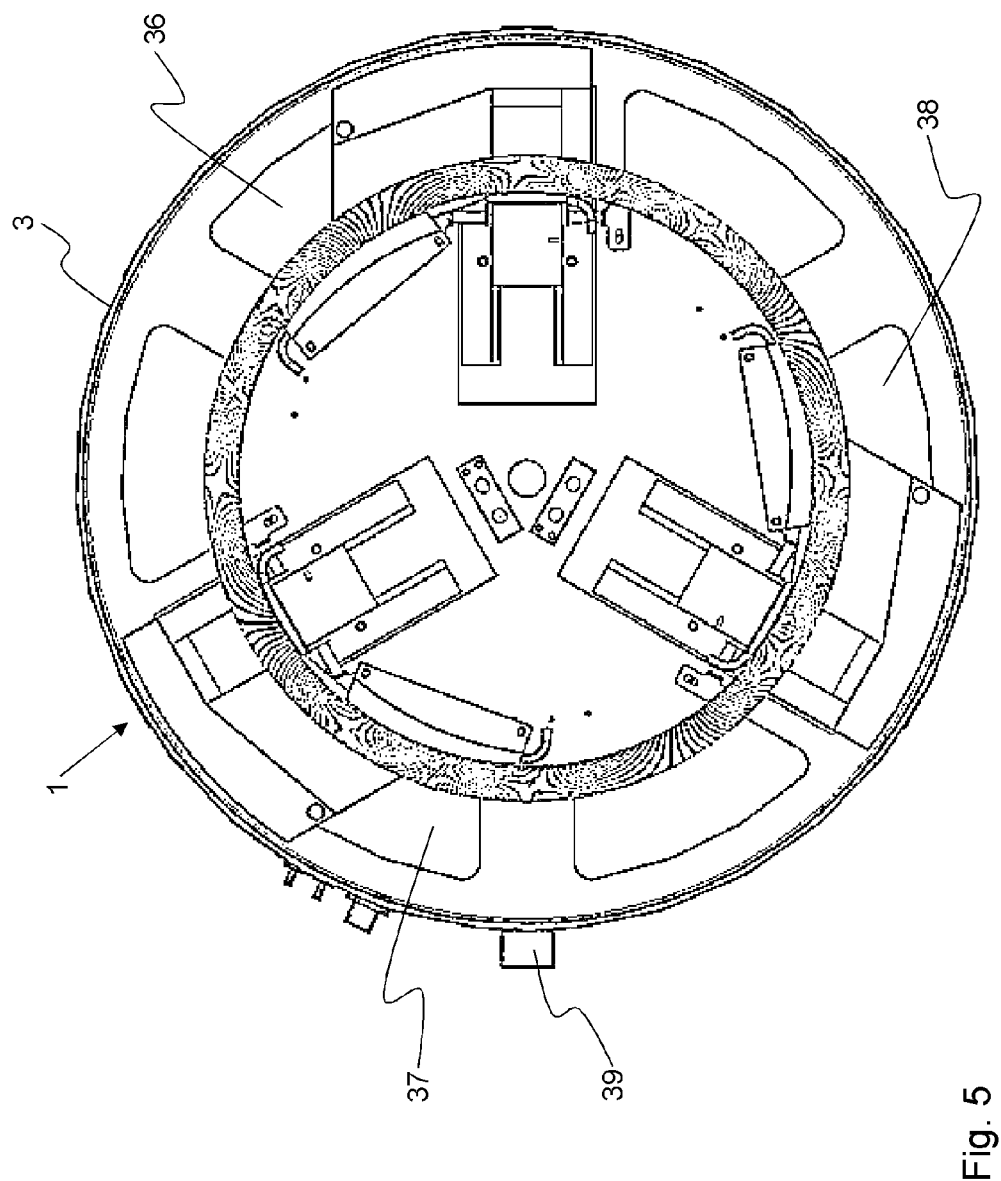
FIG. 5 is a top plan view of the sectional view illustrated in FIG. 4.

These openings and their relative position can be better seen from FIG. 5, which is a top plan view of the sectional view illustrated in FIG. 4.

Bottom group 4 which is substantially in form of a basin collects the fluid, preferably liquid thermal energy carrier of second means 32, 33, 34, to discharge it from device 1 via a discharge port 39, so that the fluid may either be made available to other devices of the invention if the temperature thereof is below the Curie temperature of the material of ring 10 of the respective further device 1 of the invention, or is simply discharged.

Figure 6:
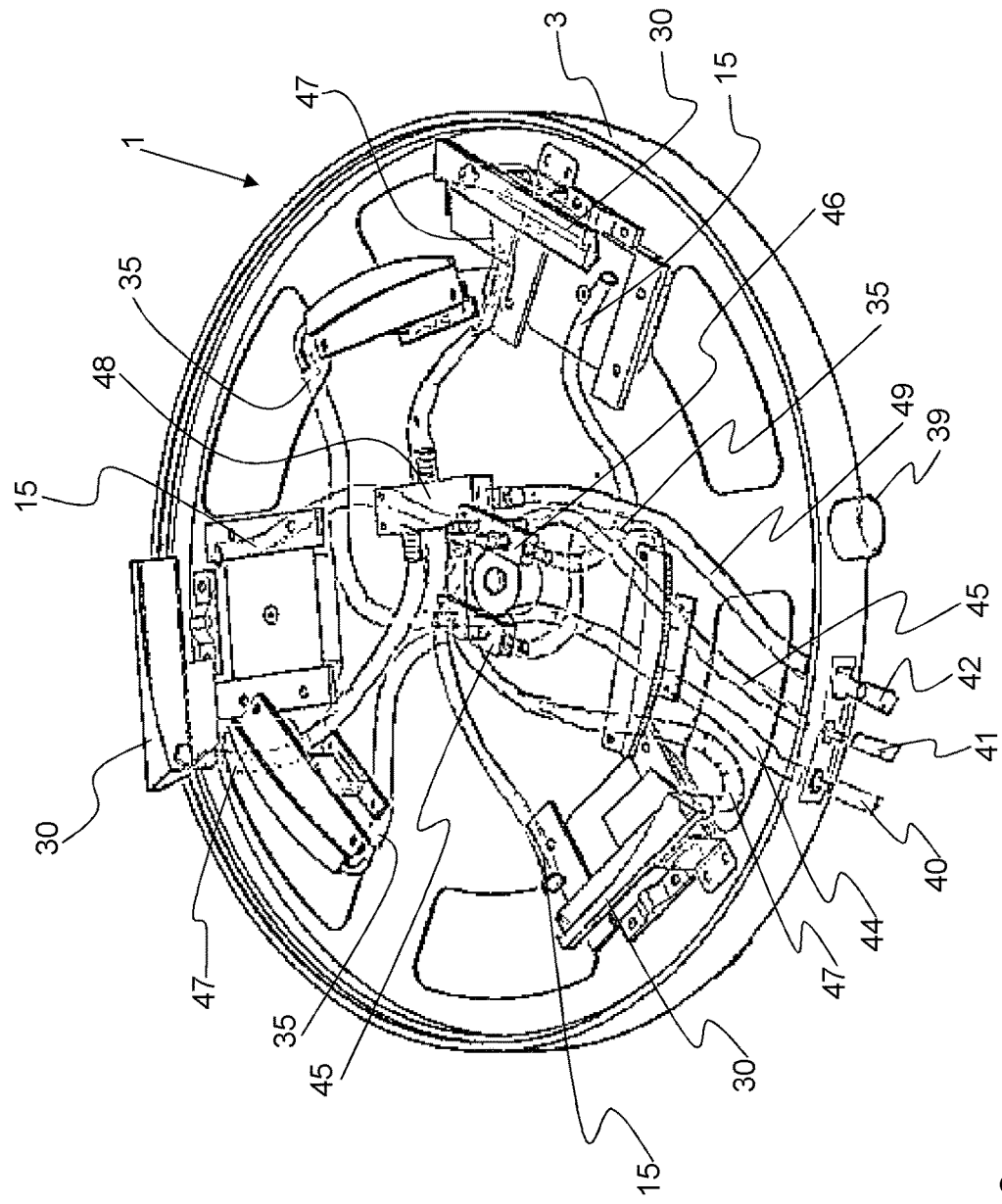
FIG. 6 is a perspective view of the bottom plate from above illustrating parts of the piping of the device according to the invention.

Reference is now made to FIG. 6 which is a perspective view of the bottom plate from above illustrating parts of the piping of device 1 according to the invention with partially illustrated external ports 40, 41 and 42.

External port 40 is used to supply the second thermal energy carrier which is supplied to feed conduits 35 via a conduit 43, in particular a thermally insulated conduit, and via a manifold block 44 within bottom group 4. Feed conduits 35 are preferably also thermally insulated.

External port 41 is used to supply the first thermal energy carrier which is supplied to feed conduits 15 via a conduit 45, in particular a thermally insulated conduit, and via a manifold block 46 within bottom group 4. Feed conduits 15 are preferably also thermally insulated.

For a better understanding, magnets 7, 8, and 9 are not illustrated because they would obscure the respective collecting basins 30 associated therewith. From the collecting basins, the first thermal energy carrier after having passed through ring 10 is fed via discharge conduits 47 to a manifold block 48 from which it is fed to external port 42 via a discharge conduit 49.

In this way, it can be seen how the feed and discharge conduits of device 1 are arranged at a lateral side to provide for axial cascadability.

Figure 7:
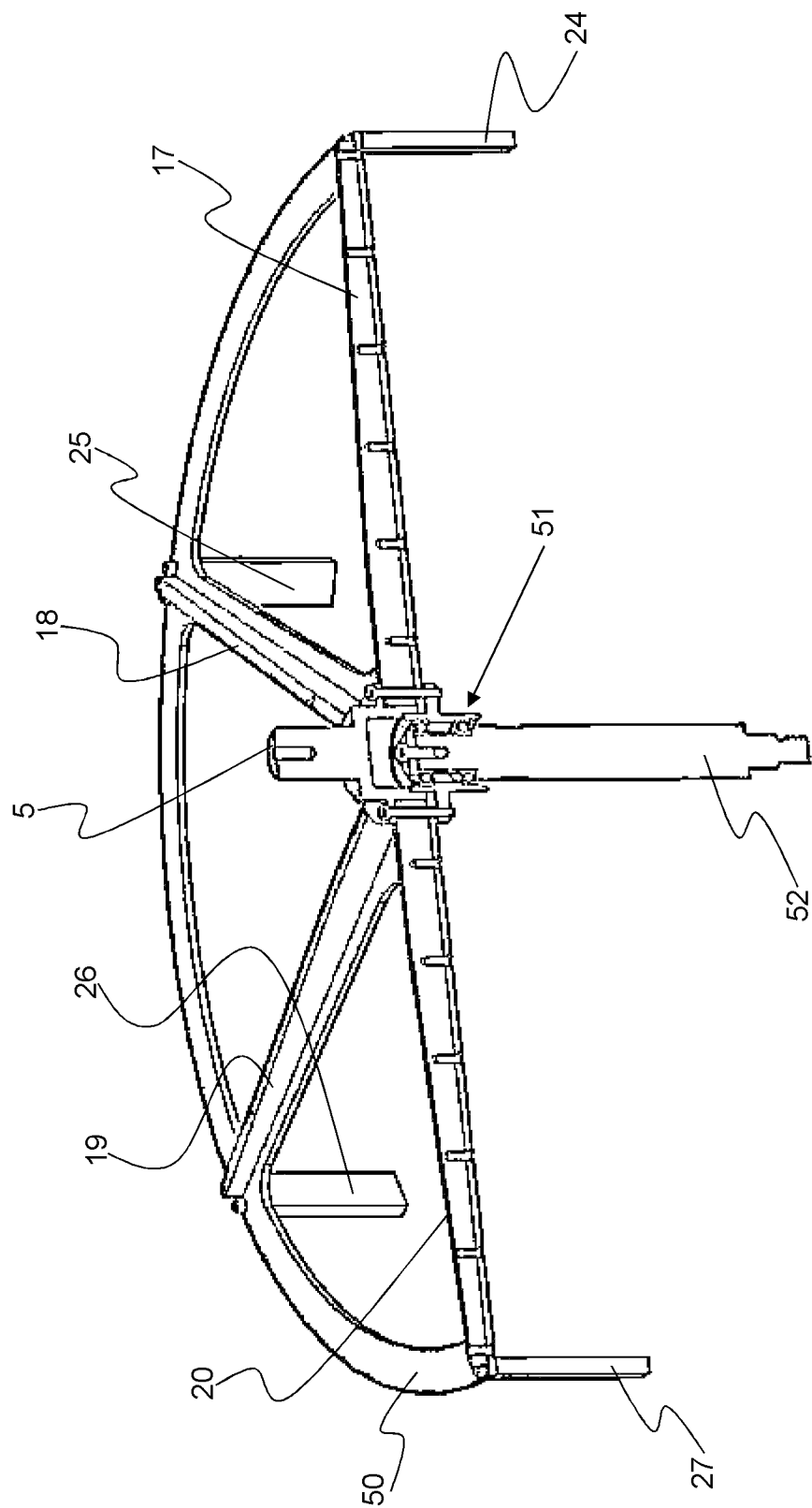
FIG. 7 is a perspective sectional view from above, illustrating a detail of the output shaft with portions of the support arms and of the upper support ring.

Reference is now made to FIG. 7 which is a perspective sectional view from above illustrating a detail of the output shaft 5 with portions of support arms 17 to 23 and supports 24 to 29 secured thereto, and the upper support ring 50.

The upper support ring stabilizes the respective support arms both in tangential and in axial direction of device 1 and in this way provides for a very precise mechanical guiding of ring 10 through magnets 7, 8, and 9.

Figure 8:
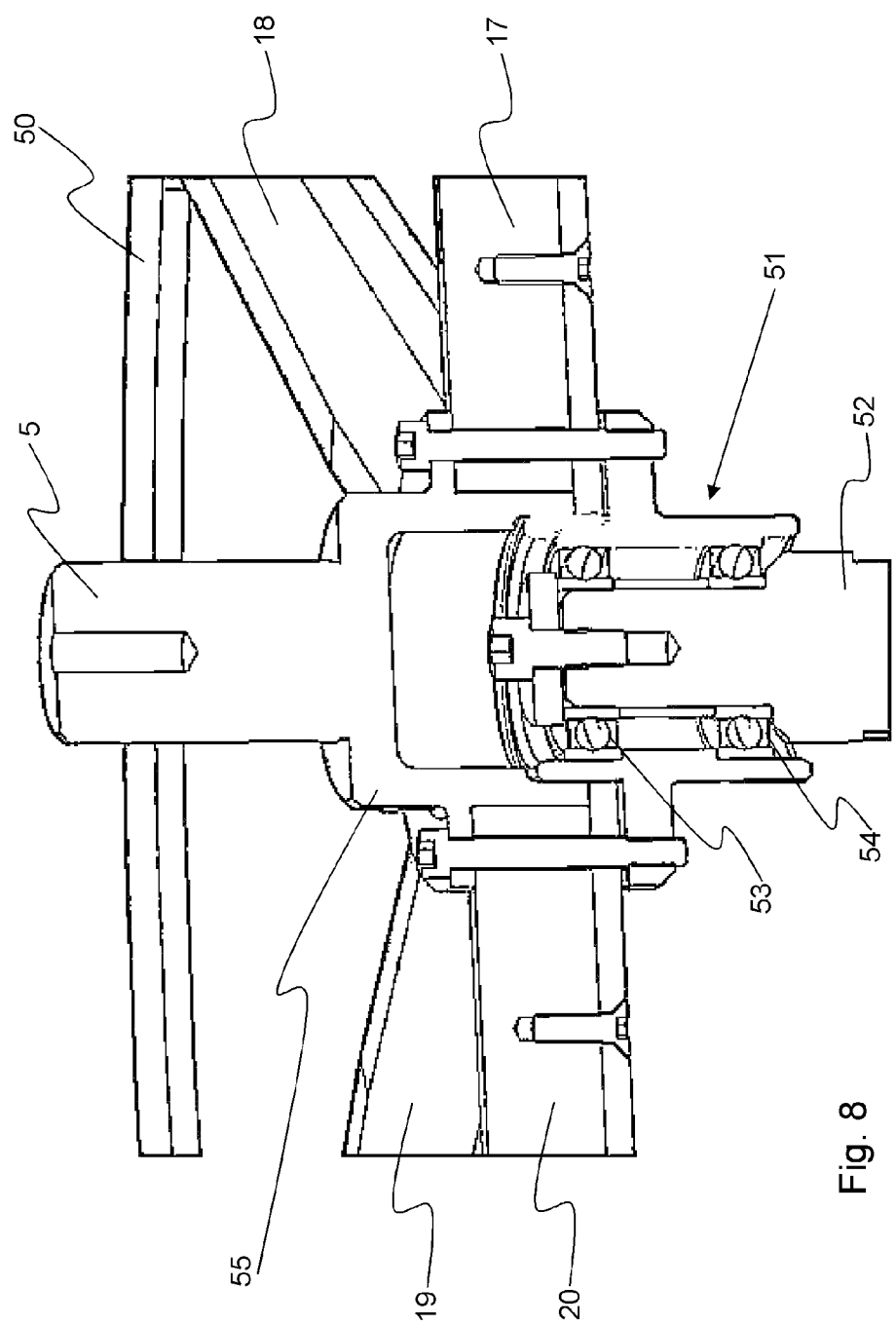
FIG. 8 is an enlarged view of a detail of FIG. 7 from the central region thereof.

A central bearing 51 and a shaft, in particular output shaft 5, take up the torque generated by the material of ring 10. Bearing 51 is shown in more detail in FIG. 8 and will be described in more detail with reference to this figure.

Central bearing 51 is held on a stator 52 which is mounted in bottom group 4 and which has two bearings 53, 54 mounted at an upper end thereof and forming parts of central bearing 51.

A cup 55 is supported on the outer surface of bearings 53 and 54, from which output shaft 5 extends axially and support arms 17 to 23 extend radially.

In a further embodiment not shown in the figures, stator 52 is configured as a hollow shaft, and output shaft 5 extends from cup 55 not only axially upwards but also through the interior of stator 52 which is configured as a hollow shaft, and through bottom group 4 to the outside, so that output shaft 5 may transfer torques both above device 1 and below device 1.

Figure 9:
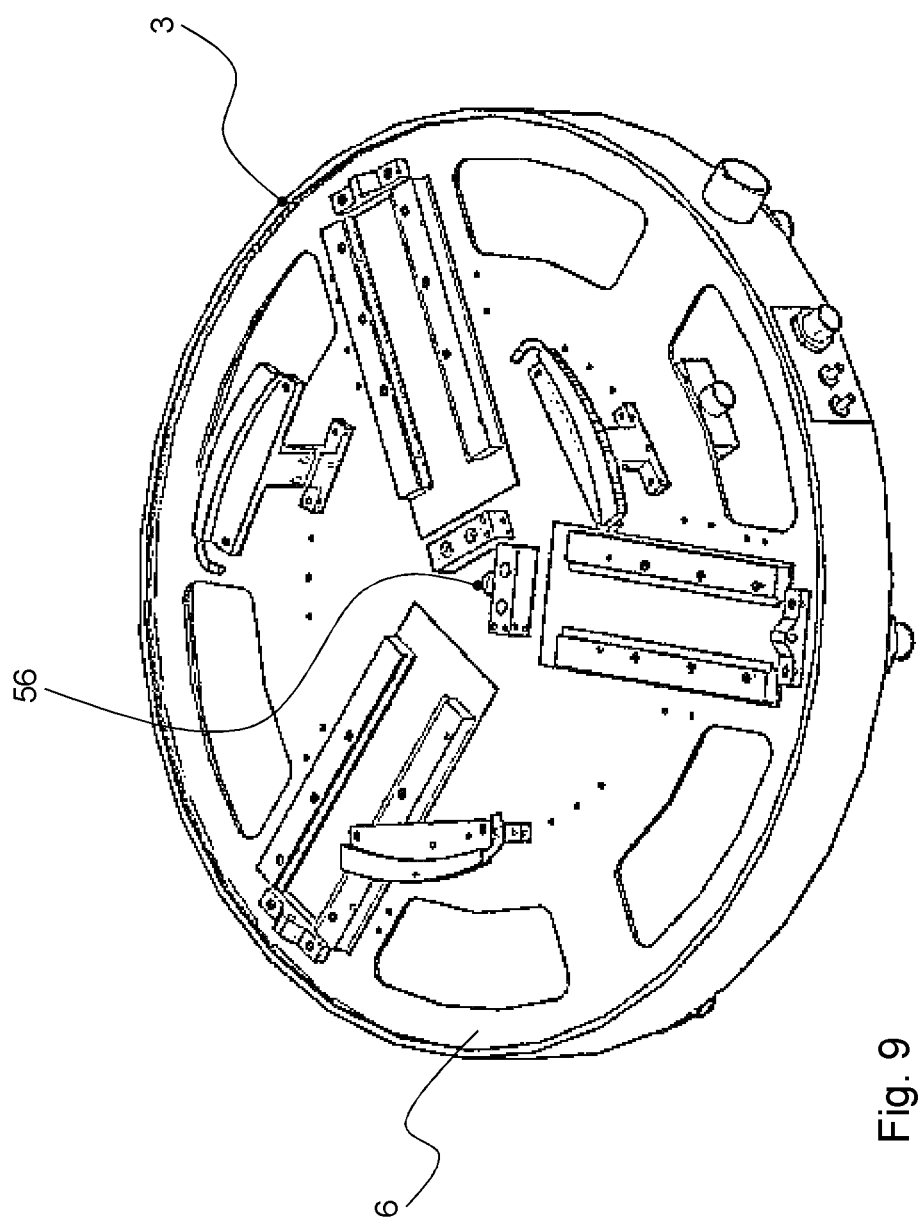
FIG. 9 is a perspective view of the bottom plate from above, with a collecting basin thereof and a through opening for the output shaft.

For this purpose, FIG. 9 illustrates opening 56 through which the axially downward extending portion of output shaft 5 passes through bottom group 4, in particular through the bottom plate 6 thereof.

Without loss of generality, the device of the invention may be used in power plants or in particular in the chemical industry for exploiting waste heat of chemical reactions.

In mobile applications, device 1 of the invention may further be used for exploiting waste heat of internal combustion engines, in particular waste heat from exhaust gases of internal combustion engines or heat of the liquid cooling medium of the internal combustion engine.

In stationary use, device 1 according to the invention may be used for exploiting household waste heat, in particular waste heat of exhaust gases from heating and air conditioning equipment.

Even the use of geothermal heat is within the scope of the invention.

LIST OF REFERENCE NUMERALS

1 Device of the invention
2 Casing
3 Cover part
4 Bottom group
5 Output shaft
6 Bottom plate
7 Magnet
8 Magnet
9 Magnet
10 Ring, movable material
11 Shielding plate
12 Shielding plate
13 Arm
14 Arm
15 Feed conduit
16 Ribs
17 Support arm
18 Support arm
19 Support arm
20 Support arm
21 Support arm
23 Support arm
24 Support
25 Support
26 Support
27 Support
28 Support
29 Support
30 Collecting basin
31 Discharge conduit
32 Second means for changing the temperature
33 Second means for changing the temperature
34 Second means for changing the temperature
35 Feed conduit
36 Opening
37 Opening 38 Opening
39 Discharge port
40 External port
41 External port
42 External port
43 Conduit
44 Manifold block
45 Conduit
46 Manifold block
47 Discharge conduit
48 Manifold block
49 Discharge conduit
50 Support ring
51 Central bearing
52 Stator
53 Bearing
54 Bearing
55 Cup
56 Opening
60 Nozzles
65 Passage
70 Substrate
71 Coating

The invention claimed is:

1. A device for generating a movement comprising:
an annular shaped material with openings for passing through a thermal energy carrier;
at least one magnet in the form of at least one yoke that exerts an attractive force on the material, wherein the material is arranged in proximity to the magnet or in the magnet, wherein the attractive force between the at least one magnet and the material is weakened by thermal action on at least one region of the material, and wherein the material is in a non-superconductive state during the thermal action;
a first temperature control for changing a temperature of the material, wherein the first temperature control is arranged in the magnet or in the proximity thereof; and
a plurality of nozzles arranged at a rear side of the magnet, wherein the material has lateral openings forming passages in an interior of the material, and the thermal energy carrier is introduced into the passages by the nozzles.

2. The device as claimed in claim 1, wherein the magnet at least partially surrounds the annular shaped material.

3. The device as claimed in claim 1, wherein the first temperature control allows the thermal energy carrier to come into contact with the annular shaped material.

4. The device as claimed in claim 1, wherein the thermal energy carrier is a fluid thermal energy carrier, and wherein the first temperature control brings the fluid thermal energy carrier in contact with the annular shaped material.

5. The device as claimed in claim 1, wherein the first temperature control raises a temperature of regions of the annular shaped material above a Curie temperature thereof using the thermal energy carrier.

6. The device as claimed in claim 1, further comprising a second temperature control for changing the temperature of the annular shaped material in the proximity of the magnets.

7. The device as claimed in claim 6, wherein the second temperature control is arranged in a region in which a magnetic field has dropped to a value of less than 50%, relative to a maximum field within a yoke of the magnet.

8. The device as claimed in claim 6, wherein the second temperature control brings the thermal energy carrier in contact with the annular shaped material.

9. The device as claimed in claim 6, wherein the second temperature control lowers the temperature of regions of the annular shaped material below the Curie temperature thereof using the thermal energy carrier.

10. The device as claimed in claim 1, wherein the annular shaped material is movable or rotatable about a circular path relative to the magnet.

11. The device as claimed in claim 1, wherein the passages extend in a radial direction in the annular shaped material.

12. The device as claimed in claim 1, wherein the passages extend in a direction inclined at an angle α to a radial direction.

13. The device as claimed in claim 1, wherein the passages extend curvilinearly in a radial direction.

14. The device as claimed in claim 1, wherein the passages substantially extend in an axial direction.

15. The device as claimed in claim 6, wherein the magnet and the first and/or the second temperature control is/are in a stationary arrangement.

16. The device as claimed in claim 1, wherein the annular shaped material comprises gadolinium.

17. The device as claimed in claim 16, wherein the annular shaped material comprises metallic gadolinium, and wherein the metallic gadolinium has a purity of at least 99.995%.

18. The device as claimed in claim 1, wherein the annular shaped material comprises a substrate coated with a coating.

19. The device as claimed in claim 18, wherein the substrate comprises plastics.

20. The device as claimed in claim 18, wherein the coating comprises a low-melting alloy.

21. The device as claimed in claim 1, wherein the magnet is a permanent magnet.

22. The device as claimed in claim 6, wherein the magnet comprises a plurality of magnets and the first and second temperature control comprise a plurality of first temperature controls and second temperature controls.

23. The device as claimed in claim 1, further comprising a central bearing and a shaft for taking up torque generated by the annular shaped material, wherein the shaft is axially connectable to others of the device.

24. The device as claimed in claim 1, further comprising laterally arranged feed conduits and discharge conduits.

25. An assembly comprising:
a device having an annular shaped material with openings for passing through a thermal energy carrier; the device having at least one magnet in the form of at least one yoke that exerts an attractive force on the material, wherein the material is arranged in proximity to the magnet or in the magnet, wherein the attractive force between the at least one magnet and the material is weakened by thermal action on at least one region of the material, and wherein the material is in a non-superconductive state during the thermal action; a first temperature control for changing a temperature of the material, wherein the first temperature control is arranged in the magnet or in the proximity thereof; and a plurality of nozzles arranged at a rear side of the magnet, wherein the material has lateral openings forming passages in an interior of the material, and the thermal energy carrier is introduced into the passages by the nozzles; and
a motor or a generator.

26. A method comprising:
using a device in at least one application selected from the group consisting of: an energy converter in power plants, exploiting waste heat of chemical reactions, exploiting waste heat of an internal combustion engine, exploiting household waste heat, exploiting geothermal heat, and driving an electric generator for generating electric energy, and wherein the device comprises an annular shaped material with openings for passing through a thermal energy carrier;

at least one magnet in the form of at least one yoke that exerts an attractive force on the annular shaped material, wherein the annular shaped material is arranged in proximity to the magnet or in the magnet, wherein the attractive force between the at least one magnet and the annular shaped material is weakened by thermal action on at least one region of the material, and wherein the material is in a non-superconductive state during the thermal action;

a first temperature control for changing a temperature of the annular shaped material, wherein the first temperature control is arranged within the magnet or in the proximity thereof; and a plurality of nozzles arranged at a rear side of the magnet, wherein the annular shaped material has lateral openings forming passages in an interior of the annular shaped material, and the thermal energy carrier is introduced into the passages by the nozzles.

* * * * *